United States Patent [19]

Torii et al.

[11] Patent Number: 5,189,351
[45] Date of Patent: Feb. 23, 1993

[54] CORRECTIVE POSITIONING METHOD IN A ROBOT

[75] Inventors: Nobutoshi Torii, Hachioji; Ryo Nihei; Mitsuhiro Yasumura, both of Yamanashi, all of Japan

[73] Assignee: Fanuc Ltd., Minamitsuru, Japan

[21] Appl. No.: 566,464

[22] PCT Filed: Jan. 23, 1990

[86] PCT No.: PCT/JP90/00075

§ 371 Date: Aug. 16, 1990

§ 102(e) Date: Aug. 16, 1990

[87] PCT Pub. No.: WO90/08016

PCT Pub. Date: Jul. 26, 1990

[30] Foreign Application Priority Data

Jan. 23, 1989 [JP] Japan .................. 1-11951

[51] Int. Cl.$^5$ .................. B25J 9/10; G05D 3/12
[52] U.S. Cl. .................. 318/568.19; 318/572; 318/632; 395/80; 901/9; 364/474.31
[58] Field of Search .................. 318/560–646; 364/513, 474.3, 474.31; 901/3, 5, 9, 15–23

[56] References Cited

U.S. PATENT DOCUMENTS

| | | | |
|---|---|---|---|
| 4,423,481 | 12/1983 | Reid-Green et al. | 364/474.31 |
| 4,488,242 | 12/1984 | Tabata et al. | 364/513 |
| 4,547,858 | 10/1985 | Horak | 364/513 |
| 4,594,670 | 6/1986 | Itoh | 318/632 X |
| 4,604,716 | 8/1986 | Kato et al. | 318/625 X |
| 4,670,849 | 6/1987 | Okada et al. | 318/632 X |
| 4,698,572 | 10/1987 | Stone | 318/567 X |
| 4,710,884 | 12/1987 | Tokairin et al. | 364/513 |
| 4,722,063 | 1/1988 | Yasukawa et al. | 364/513 |
| 4,771,222 | 9/1988 | Nakashima et al. | 318/572 |
| 4,794,547 | 12/1988 | Nishida | 364/513 |
| 4,873,476 | 10/1989 | Kurakake et al. | 318/632 X |
| 4,894,788 | 1/1990 | Stelzer | 364/513 |
| 4,908,559 | 3/1990 | Kurakake et al. | 318/568.22 |
| 4,967,126 | 10/1990 | Gretz et al. | 364/513 X |
| 4,999,553 | 3/1991 | Seraji | 318/561 |

Primary Examiner—Paul Ip
Attorney, Agent, or Firm—Staas & Halsey

[57] ABSTRACT

A corrective positioning method in a robot, capable of eliminating degraded positioning accuracy attributable to inherent errors in the robot. By using displayed rotary angles of first and second links (1, 2) determined by a mastering sequence associated with known points, a simultaneous equation including, as unknowns, link length errors ($\Delta l1$, $\Delta l2$) and actual rotary angles ($\theta 1$, $\theta 2$) of the links is solved, to thereby determine the link length errors, errors ($\Delta X0$, $\Delta y0$) of a pivotal center position of an arm, and errors ($\Delta \theta 10$, $\Delta \theta 20$) of rotary angles of the links. During a robot operation, X-axis and Y-axis target moving positions of a distal end of the arm, which are specified by a program, are corrected by using the pivotal center position error, and the actual link lengths are calculated by using the link length errors, and further rotary angles of servomotors respectively associated with the first and second links are determined by a coordinate conversion process performed on the basis of the corrected moving positions, the actual link lengths and the link rotary angle errors.

2 Claims, 4 Drawing Sheets

CORRECTIVE POSITIONING METHOD IN A ROBOT

TECHNICAL FIELD

The present invention relates to a positioning method in a robot, and more particularly, to a corrective positioning method in an industrial robot, capable of eliminating degraded positioning accuracy attributable to inherent fabrication and assemblage errors in the robot.

BACKGROUND ART

One type of industrial robot that has a robot arm with links driven by servomotors to change the position and orientation of an end effector mounted to the distal end of the arm on this type of robot, thereby carrying out required work, one known method has been to determine target rotary positions of the servomotors for individual axes in dependence on a target moving position of the end effector, and detect actual rotary positions of these servomotors with position detectors mounted to the servomotors. As a result the servomotors are controlled in a feedback manner so that the actual rotary positions of the servomotors coincide with their target rotary positions. Further, in order to improve positioning repeatability in a robot of this kind, various improvements have been made in resolution of the position detector and in performance of a servo mechanism.

However, even if the aforementioned measures are taken, it is often difficult to carry out positioning with a required accuracy when a robot is operated in accordance with a program prepared by offline programming, or prepared on the basis of teaching results for another robot of the same type.

The above difficulty occurs for the reason that, typical offline programming is performed by using the target moving position of the end effector. This position is represented by a program coordinate system whose coordinate origin coincides with a designed pivotal center position of the robot arm, and by using, e.g., designed link lengths defined as arm link lengths, in determining the target rotary positions of the motors for the individual axes in dependence on the target moving position of the end effector. Since an actual pivotal center position of the arm deviates from the designed pivotal center position due to fabrication and assemblage errors of the robot concerned, the program coordinate system for offline programming does not coincide, in a strict sense, with a robot coordinate system set for the robot body concerned. Further, the actual lengths of the respective links are different from the designed link lengths set and stored for the offline programming. Thus, the robot itself is the cause of inherent positioning errors. Thus, according to the program prepared offline, it is difficult to attain a required positioning accuracy even if the above-mentioned measures such as the provision of the position detector of high-resolution type are taken.

Similarly, in a robot operation performed in accordance with a program prepared for another robot of the same kind, the positioning accuracy is also degraded for the aforementioned reason, i.e., the presence of variations of the link lengths, the pivotal center position of the arm, etc. which are found even among robots of the same kind.

It is further considered that the above drawback is attributable to so-called mastering (calibration) which is performed to determine the target rotary positions corresponding to the target moving position, i.e., to match the program coordinate system to the robot coordinate system. A general mastering operation involves detecting the rotary angles of the motors for the individual axes, with the end effector positioned at a reference point which is known in the robot coordinate system, and storing these detected rotary angles as the motor rotary angles for positioning the end effector at that point in the program coordinate system which corresponds to the reference point. Then, during a robot operation, the target rotary positions of the motors for the individual axes, determined by a coordinate conversion process based on the target moving position of the end effector given in the program, are calculated by the use of the aforesaid motor rotary angles. However, according to the above mastering operation, it is difficult to eliminate calculation errors of the target motor rotary positions for the individual axes, attributable to the deviation of the pivotal center position of the arm and to the deviations in the link sizes. This makes it difficult to eliminate degraded positioning accuracy.

Moreover, in a robot provided with a visual sensor, it is known to teach a particular position of the robot to the visual sensor for calibration, so as to match a camera coordinate system for the visual sensor to a robot coordinate system, thereby improving the positioning accuracy. Even in this case, however, the positioning accuracy is degraded due to the presence of the inherent errors in the respective robot.

DISCLOSURE OF THE INVENTION

The object of the present invention is to provide a corrective positioning method in a robot, capable of eliminating degraded positioning accuracy attributable to errors which are inherent to the robot even when a positioning command is input which does not take into account the inherent errors in the robot.

In order to achieve the above-mentioned object, the corrective positioning method of the present invention pertains the steps of (a) setting a correction parameter indicative of an error inherent to a robot, and (b) correcting a positioning command, which does not take into account the error inherent to the robot, on the basis of the correction parameter when the positioning command is input.

As mentioned above, according to the present invention, since the positioning command which does not take into account the inherent error in the robot is corrected on the basis of the correction parameter indicative of the error, the inherent error in the robot can be compensated for even when the robot is operated in accordance with the positioning command of this kind. The positioning command is, by way of example, read out from a program prepared offline or prepared for another robot. The effort is also compensated when the robot is operated by using a visual sensor. Accordingly, the positioning accuracy of the robot can be improved.

BEST MODE OF CARRYING OUT THE INVENTION

Figure 1:
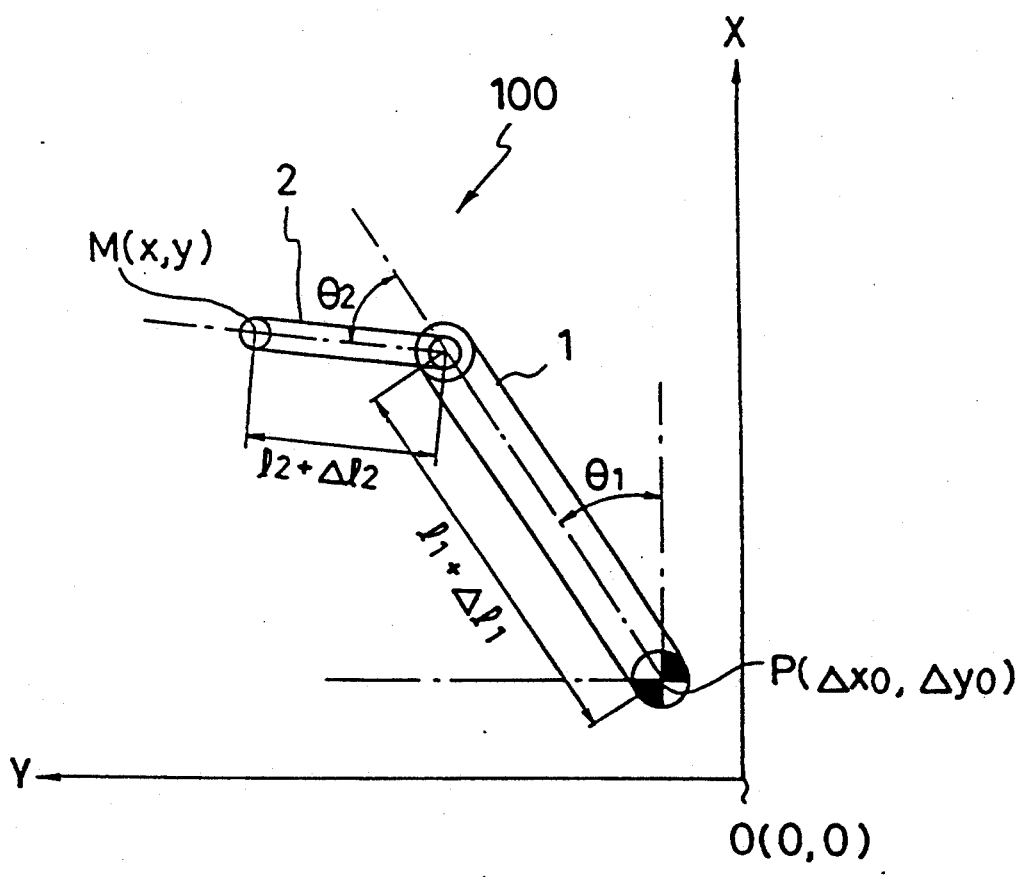
FIG. 1 is a schematic plan view showing a body of a horizontal articulated robot for embodying a corrective positioning method according to an embodiment of the present invention.
Figure 2:
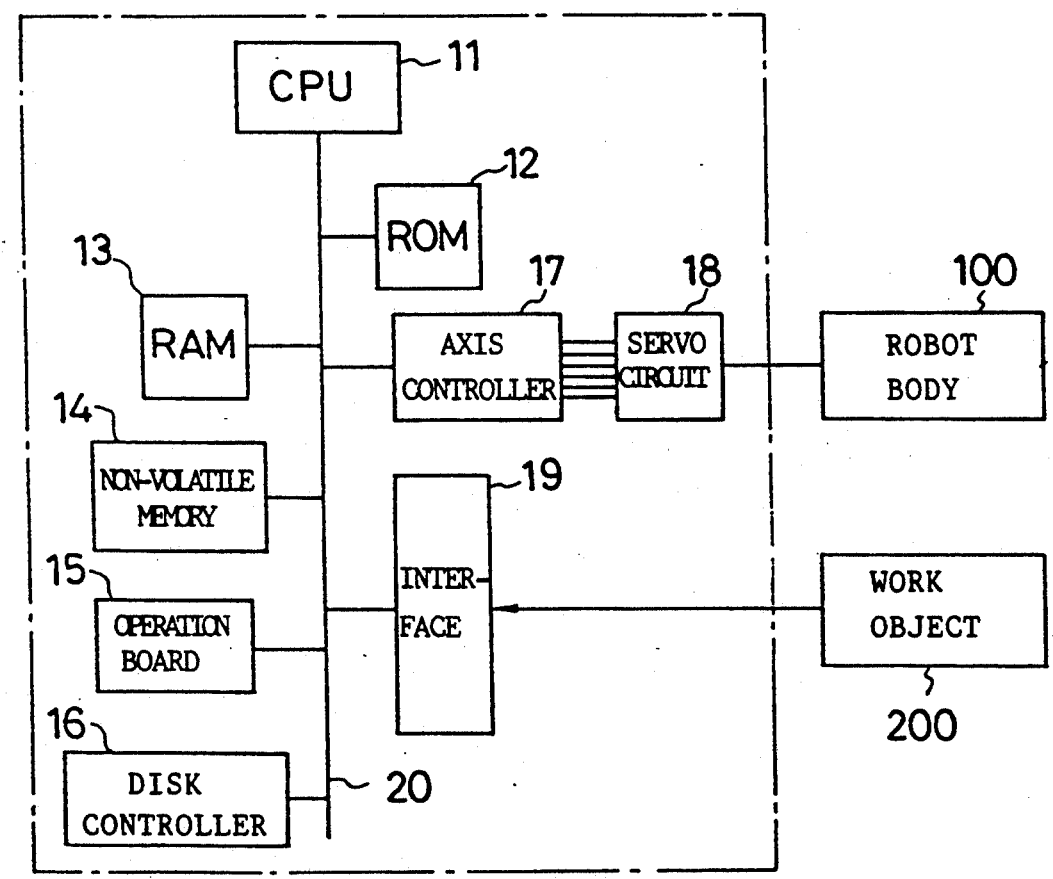
FIG. 2 is a schematic block diagram showing a control unit for controlling the robot body of FIG. 1.

Referring to FIGS. 1 and 2, a horizontal articulated robot to which a corrective positioning method according to an embodiment of the present invention is applied, comprises a robot body (FIG. 1) 100 having an arm consisting of first and second links 1, 2 and arranged to be mounted at its distal end with an end effector (not shown), and a control unit (FIG. 2) 10 for controlling the drive of the robot body. The first link has a proximal end thereof arranged to be rotatable around a pivotal center P of the arm in an XY plane, and the links 1 and 2 are coupled to each other for relative rotary motion in the XY plane.

The control unit 10 comprises a central processing unit (CPU) 11, a read-only memory (ROM) 12 storing therein a control program, a random access memory (RAM) 13 for temporal storage of data, arithmetic operation results, etc., a non-volatile memory 14 composed of a bubble memory, a CMOS memory of a battery back-up type, or the like. Further, the control unit 10 comprises an operation board 15, a disk controller 16, an axis controller 17 accommodating therein an interpolation device, a servo circuit 18 connected to the axis controller 17 and arranged to drive servomotors for individual axes of the robot body 100, i.e., first and second servomotors (not shown) for rotatively driving the links 1 and 2, and an interface 19 connected to various sensors and various actuators (none of which is illustrated), provided in a work object 200 of the robot, and the like. The aforesaid elements 12–17 and 19 are connected to the CPU 11 through busses 20.

The control unit 10 is arranged to execute a conversion process for converting a command position M(x, y) stated in a program, which is prepared by offline programming by using a rectangular coordinate system O-XY whose origin coincides with a designed pivotal center position O of the arm, into rotary angles $\theta_1$, $\theta_2$ of the first and second links. Further, the control unit 10 is arranged to store first and second link lengths (e.g., designed link lengths) l1, l2 serving as conversion process parameters. On the other hand, actual lengths of the first and second links 1, 2 are respectively represented by $l1+\Delta l1$ ($=l1'$), $l2+\Delta l2$ ($=l2'$), where $\Delta l1$, $\Delta l2$ respectively denote deviations. The actual pivotal center position P($\Delta x0$, $\Delta y0$) of the arm of the robot body 100 is deviated from the origin O of the rectangular coordinate system O-XY by the deviations $\Delta x0$ and $\Delta y0$ in the X-axis and Y-axis directions, respectively.

According to a conversion process neglecting the errors $\Delta l1$, $\Delta l2$, $\Delta x0$ and $\Delta y0$ in the link lengths and the pivotal center position of the arm, the link rotary angles $\theta_1$, $\theta_2$, which satisfy the following equations (1) and (2), are derived on the basis of the command position M(x, y) stated in the program.

$$x = l1 \cdot \cos\theta_1 + l2 \cdot \cos(\theta_1 + \theta_2) \tag{1}$$

$$y = l1 \cdot \sin\theta_1 + l2 \cdot \sin(\theta_1 + \theta_2) \tag{2}$$

When the first and second links are rotated through the derived rotary angles $\theta_1$, $\theta_2$, the arm distal end is positioned at X-axis and Y-axis positions $x+\Delta x$, $y+\Delta y$ respectively represented by the following equations (3) and (4) due to the presence of the errors $\Delta l1$, $\Delta l2$, $\theta x 0$ and $\Delta y0$. Namely, positioning errors $\Delta x$, $\Delta y$ are produced.

$$x+\Delta x = (l1+\Delta l1)\cdot\cos\theta_1 + (l2+\Delta l2)\cdot\cos(\theta_1+\theta_2) + \Delta x0 \tag{3}$$

$$y+\Delta y = (l1+\Delta l1)\cdot\sin\theta_1 + (l2+\Delta l2)\cdot\sin(\theta_1+\theta_2) + \Delta y0 \tag{4}$$

In the following, an operation of the robot constructed as mentioned above will be explained with reference to FIGS. 3–7 together with FIGS. 1 and 2.

Prior to actual robot work, ordinary mastering using the aforementioned single reference point (the point M1(x1, y1)) is carried out, and then a mastering sequence is performed by using two points M2(x2, y2) and M3(x3, y3) whose coordinate positions in the program coordinate system O-XY are known, like the point M1.

Figure 5:
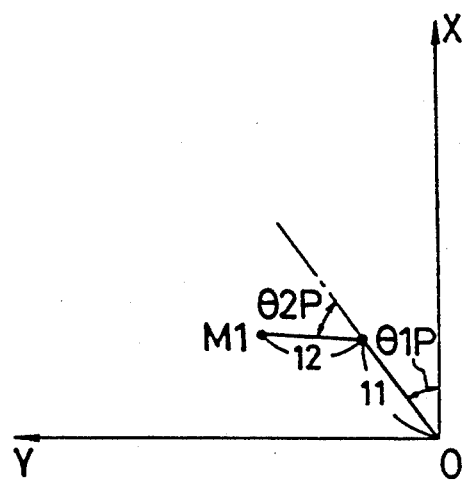
FIG. 5 is a view showing a state where a distal end of an arm is positioned at a first point in case that no errors are found in a pivotal center position of the arm and in link lengths.

More specifically, at first, the ordinary mastering is effected, with the arm distal end positioned at the point M1(x1, y1). As a result of the mastering at the point M1, rotary angles $\theta_{1p}$ and $\theta_{p2}$ around axes respectively corresponding to the first and second links are provided. As shown in FIG. 5, the rotary angles $\theta_{1p}$ and $\theta_{2p}$ satisfy the following equations (5) and (6).

$$x1 = l1 \cdot \cos\theta_{1p} + l2 \cdot \cos(\theta_{1p}+\theta_{2p}) \tag{5}$$

$$y1 = l1 \cdot \sin\theta_{1p} + l2 \cdot \sin(\theta_{1p}+\theta_{2p}) \tag{6}$$

When the arm distal end is positioned at the point M1 in the above manner, actually, the first and second links 1 and 2 are respectively rotated through rotary angles $\theta_1$ and $\theta_2$, which satisfy the following equations (7) and (8), due to the presence of the link length errors $\Delta l1$, $\Delta l2$ and the deviations $\Delta x0$, $\Delta y0$ of the pivotal center position of the arm. These actual rotary angles $\theta_1$ and $\theta_2$ are unknown.

$$x1 - \Delta x0 = (l1+\Delta l1)\cdot\cos\theta_1 + (l2+\Delta l2)\cdot\cos(\theta_1+\theta_2) \tag{7}$$

$$y1 - \Delta y0 = (l1+\Delta l1)\cdot\sin\theta_1 + (l2+\Delta l2)\cdot\sin(\theta_1+\theta_2) \tag{8}$$

The control unit 10 recognizes and stores displayed rotary angles $\theta_{1p}$ and $\theta_{2p}$ in the control unit 10, obtained by the mastering using the point M1, as the actual link rotary angles $\theta_1$ and $\theta_2$, although the displayed rotary angles $\theta_{1p}$ and $\theta_{2p}$ differ from the actual link rotary angles $\theta_1$ and $\theta_2$. In other words, the coordinate system O-XY of FIG. 5 is reproduced as a coordinate system P-X"Y" of FIG. 6 in the robot body 100.

Figure 7:
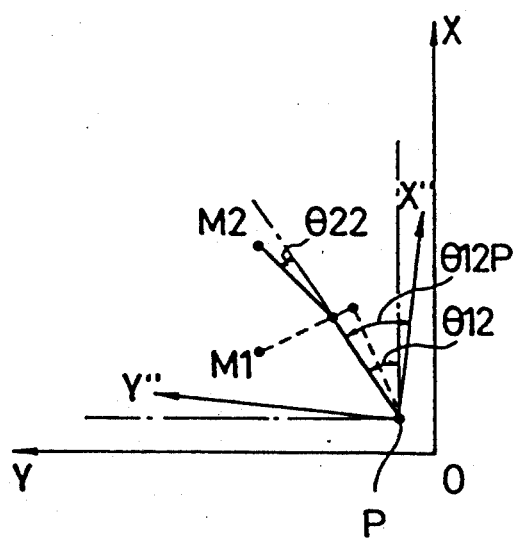
FIG. 7 is a view, similar to FIG. 6, showing a state where the arm distal end is positioned at a second point.

Next, the subsequent mastering is carried out, with the robot arm positioned at the point M2, whereby displayed rotary angles $\theta_{12p}$ and $\theta_{22p}$ associated with two axes are provided (see, FIG. 7). As in the aforesaid case, the displayed rotary angles $\theta_{12p}$ and $\theta_{22p}$ differ from actual rotary angles $\theta_{11}$ and $\theta_{22}$. The actual link rotary angles $\theta 11$ and $\theta 22$ are unknown and satisfy the following equations (9) and (10), respectively.

$$x2-\Delta x0=(l1+\Delta l1)\cdot\cos\theta 12+(l2+\Delta l2)\cdot\cos(\theta 12+\theta 22) \quad (9)$$

$$y2-\Delta y0=(l1+\Delta l1)\cdot\sin\theta 12+(l2+\Delta l2)\cdot\sin(\theta 12+\theta 22) \quad (10).$$

Figure 6:
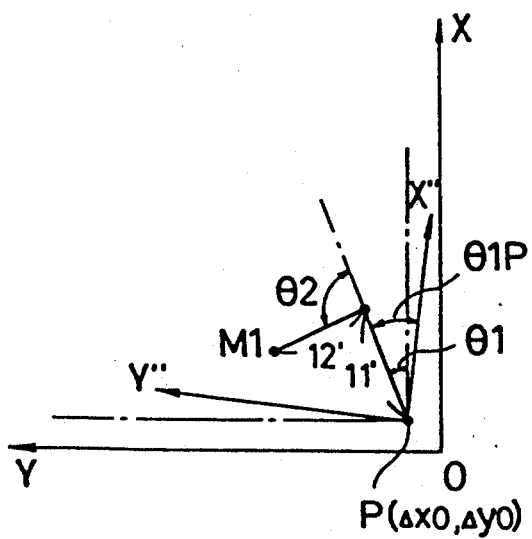
FIG. 6 is a view, similar to FIG. 5, for the robot body of FIG. 1.

From the geometrical point of view, the following equations (11) and (12) are derived from FIGS. 6 and 7.

$$\Delta\theta 12=\theta 12-\theta 1=\theta 12p-\theta 1p \quad (11)$$

$$\Delta\theta 22=\theta 22-\theta 2=\theta 22p-\theta 2p \quad (12).$$

The displayed rotary angles $\theta 1p$, $\theta 2p$, $\theta 12p$ and $\theta 22p$ are known, and the angles $\Delta\theta 12$ and $\Delta\theta 22$ are calculable.

The following equations (13) and (14) are obtained from equations (7), (9) and from equations (8), (10), respectively. Meanwhile, unknowns in these equations (13), (14) are $\Delta l1$, $\Delta l2$, $\theta 1$ and $\theta 2$.

$$\begin{aligned}\Delta x2 = x2 - x1 = \\ -2\sin(\Delta\theta 12/2)\cdot\cos(\Delta\theta 12/2)\cdot(l1+\Delta l1)\cdot\sin\theta 1 - \\ 2\sin^2(\Delta\theta 12/2)\cdot(l1+\Delta l1)\cdot\cos\theta 1 - 2\sin\{\Delta\theta 12+\Delta\theta 22)/2\}\cdot \\ \cos\{(\Delta\theta 12+\Delta\theta 22)/2\}\cdot(l2+\Delta l2)\cdot\sin(\theta 1+\theta 2) - \\ 2\sin^2\{\Delta\theta 12+\Delta\theta 22)/2\}\cdot(l2+\Delta l2)\cdot\cos(\theta 1+\theta 2)\end{aligned} \quad (13)$$

$$\begin{aligned}\Delta y2 = y2 - y1 = \\ -2\sin^2(\Delta\theta 12/2)\cdot(l1+\Delta l1)\cdot\sin\theta 1 + 2\sin(\Delta\theta 12/2)\cdot \\ \cos(\Delta\theta 12/2)\cdot(l1+\Delta l1)\cdot\cos\theta 1 - 2\sin^2\{\Delta\theta 12+\Delta\theta 22)/2\}\cdot \\ \{(l2+\Delta l2)\cdot\sin(\theta 1+\theta 2)\}+2\sin(\Delta\theta 12+\Delta\theta 22)/2\}\cdot \\ \cos\{(\Delta\theta 12+\Delta\theta 22)/2\}\cdot(l2+\Delta l2)\cdot\cos(\theta 1+\theta 2)\end{aligned} \quad (14)$$

Further, the robot arm is positioned at the point M3, and then the mastering is carried out, whereby displayed rotary angles $\theta 13p$ and $\theta 23p$ for the two axes are provided. Actual link rotary angles $\theta 13$ and $\theta 23$ are unknown.

As in the aforesaid case, the following equations (15)–(18) are fulfilled between the points M1 and M3. In equations (15) and (16), symbols fx and fy denote that each of $\Delta x3$ and $\Delta y3$ is represented as a function of various parameters shown in the brace concerned.

$$\begin{aligned}\Delta x3 = x3 - x1 = \\ fx\{(l1+\Delta l1)\cdot\sin\theta 1, (l1+\Delta l1)\cdot\cos\theta 2, \\ (l2+\Delta l2)\cdot\sin(\theta 2+\theta 2), (l2+\Delta l2)\cdot\cos(\theta 1+\theta 2)\}\end{aligned} \quad (15)$$

$$\begin{aligned}\Delta y3 = y3 - y1 = \\ fy\{(l1+\Delta l1)\cdot\sin\theta 1, (l1+\Delta l1)\cdot\cos\theta 2, \\ (l2+\Delta l2)\cdot\sin(\theta 1+\theta 2), (l2+\Delta l2)\cdot\cos(\theta 1+\theta 2)\}\end{aligned} \quad (16)$$

$$\Delta\theta 13 = \theta 13 - \theta 1 = \theta 13p - \theta 1p \quad (17)$$
$$\Delta\theta 23 = \theta 23 - \theta 2 = \theta 23p - \theta 2p \quad (18)$$

After all, four equations are derived each of which contains corresponding ones of the link length errors $\Delta l1$, $\Delta l2$ and the link rotary angles $\theta 1$, $\theta 2$, as unknowns. The control unit 10 calculates the four unknowns $\Delta l1$, $\Delta l2$, $\theta 1$ and $\theta 2$ from the four equations. Further, the control unit substitutes these calculated values for equations (7) and (8) to derive the errors $\Delta x0$, $\Delta y0$ in the pivotal center position of the arm, and calculates the errors $\Delta\theta 10 (=\theta 1-\theta 1p)$, $\Delta\theta 20 (=\theta 2-\theta 2p)$ in the link rotary angles. Whereupon, the control unit 10 causes the non-volatile memory 14 to store these calculated values $\Delta x0$, $\Delta y0$, $\Delta l1$, $\Delta l2$, $\Delta\theta 10$ and $\Delta\theta 20$ as correction parameters for a playback operation of the robot performed in accordance with a program which is prepared offline.

Upon start of actual robot work, the control unit 10 receives, through the disk controller 16, the operation program prepared offline, and causes the RAM 13 to store the same program. Meanwhile, during the programming of this operation program which consists of a series of data blocks, a corrective positioning parameter m of value of "1" is written into associated data blocks of the program for which the later-mentioned correction is to be performed.

Figure 3:
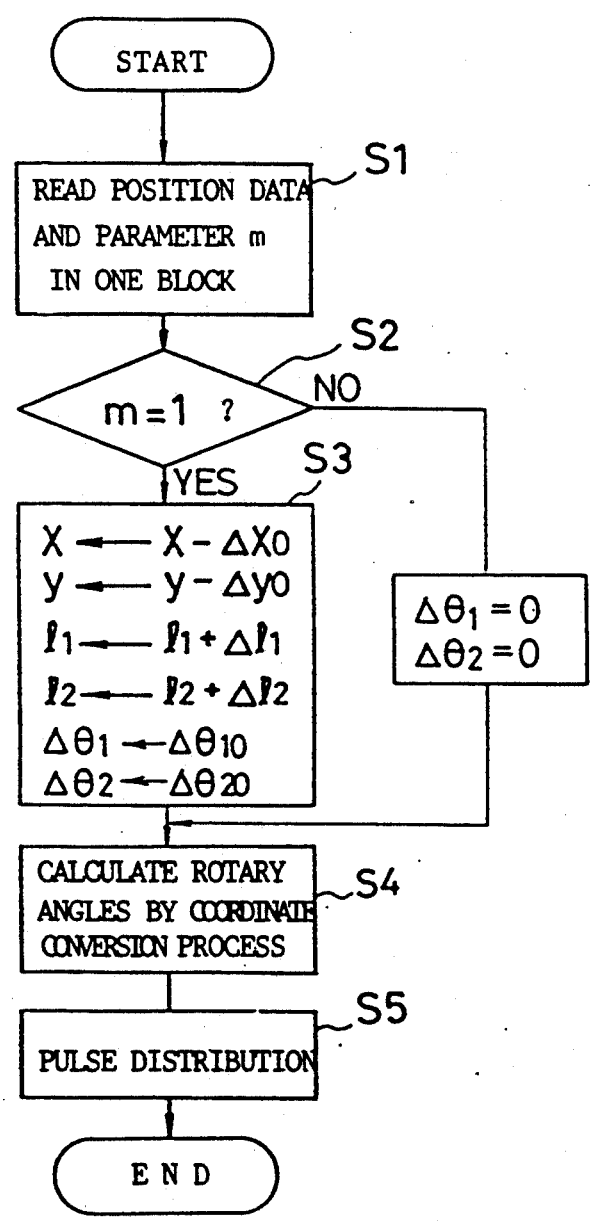
FIG. 3 is a flowchart showing a corrective positioning process performed by the control unit of FIG. 2.
Figure 4:
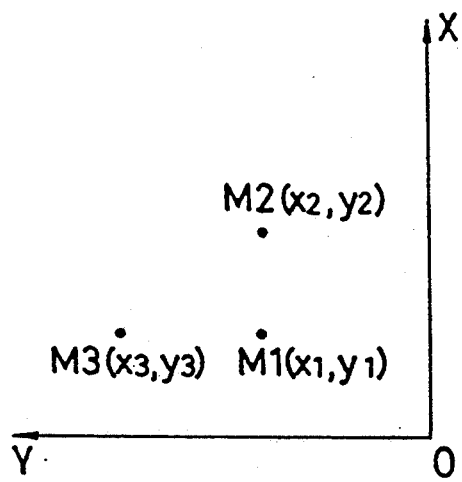
FIG. 4 is a view showing three known points associated with mastering which is performed prior to the correction process of FIG. 3.

During the operation of the robot, a corrective positioning process of FIG. 3 is periodically executed. That is, in each process cycle, the CPU 1 reads out a corresponding one of data blocks of the operation program, and reads position data (a target moving position M(x, y)) and a value of the parameter m which are stated in the data block concerned (step S1). Then, the CPU determines whether the value of the parameter m is "1" or not (step S2).

When it is determined at step S2 that the parameter m has the value of "1", and hence corrective positioning should be effected, a corrective positioning step S3 is entered. Namely, the CPU 11 subtracts the deviation amounts $\Delta x$, $\Delta y$ from the X-axis and Y-axis target moving positions x, y, and causes either the RAM 13, registers accommodated in the CPU, or the like to store the subtraction results $x-\Delta x0$, $y-\Delta y0$ as the X-axis and Y-axis target moving positions x, y. Further, the CPU adds the link errors $\Delta l1$, $\Delta l2$ to the prescribed lengths l1, l2 of the first and second links. The addition results $l1+\Delta l1$, $l2+\Delta l2$ are stored as the lengths l1, l2 of the first and second links. At the same time, $\Delta\theta 10$ and $\Delta\theta 10$ are stored as $\Delta\theta 1$ and $\Delta\theta 2$.

Next, the CPU 11 executes a coordinate conversion process from the program coordinate system to the robot coordinate system in accordance with the following equations (19) and (20), to thereby calculate target rotary angles $\theta 1$, $\theta 2$ of the first and second servomotors (step S4).

$$x=l1\cdot\cos(\theta 1+\Delta\theta 1)+l2\cdot\cos\{(\theta 1+\Delta\theta 1)+(\theta 2+\Delta\theta 2)\} \quad (19)$$

$$y=l1\cdot\sin(\theta 1+\Delta\theta 1)+l2\cdot\sin\{(\theta 1+\Delta\theta 1)+(\theta 2+\Delta\theta 2)\} \quad (20).$$

As apparent from the foregoing explanations, the coordinate conversion process is executed in accordance with the following equations (21) and (22) at step S4 of that process cycle in which the correction of the parameters x, y, l1 and l2 is effected at step S3.

$$x-\Delta x0=(l1+\Delta l1)\cdot\cos(\theta 1+\Delta\theta 10)+(l2+\Delta l2)\cdot\cos\{(\theta 1+\Delta\theta 10)+(\theta 2+\Delta\theta 20)\} \quad (21)$$

$$y-\Delta y0=(l1+\Delta l1)\cdot\sin(\theta 1+\Delta\theta 10)+(l2+\Delta l2)\cdot\sin\{(\theta 1+\Delta\theta 10)+(\theta 2+\Delta\theta 20)\} \quad (22).$$

Subsequently, the CPU 11 distributes pulses whose number corresponding to the calculated target rotary angles $\theta 1$, $\theta 2$ to the servo circuit 18, so as to rotate the first and second servomotors (the first and second links 1, 2) to their target rotary positions. As a result, when the target moving position M(x, y) of the distal end of the arm, which is represented by the program coordinate system, is given by the program, the distal end of the arm is accurately positioned. Namely, even when the robot is operated in accordance with the program prepared offline, the inherent causes of positioning errors in the robot (the error of the pivotal center position of the arm, and the error of the link length), attributable to robot fabrication and assembly errors, are compensated for, whereby the distal end of the robot is positioned at that position which accurately coincides with the target moving position specified by the program.

On the other hand, when it is determined at step S2 that the parameter m does not have the value of "1", a shift is made from step S2 to step S4, without the execution of the corrective positioning step S3. As a consequence, the time period required for the execution of processing, associated with a data block which does not require the corrective positioning, is shortened.

The present invention is not limited to the foregoing embodiment, and may be modified in various ways. For example, the present invention may be applied to various kinds of robots other than the horizontal articulated robot which has been explained in the embodiment. In the aforesaid embodiment, the case has been explained in which the robot is operated by using the program prepared offline. Alternatively, the present invention may be applied to another case where the robot is operated in accordance with a program which is prepared based on teaching results for another robot of the same kind. In this case, positioning error factors inherent to the respective robot are compensated for as in the aforesaid embodiment. Moreover, the present invention may be applied to a robot provided with a visual sensor. In this case, the positioning accuracy can be improved by further correcting correction data supplied from the visual sensor to the control unit in light of positioning errors inherent to the robot, as in the embodiment.

In the preferred embodiment, the value of the corrective positioning parameter m is set to "1" for required ones of data blocks forming the program, so that the corrective positioning is carried out in relation solely to these data blocks. Alternatively, the corrective positioning process may be made for the whole of the program. In this case, the parameter m is set to the value of "1" for all of the data blocks, or a code for carrying out the corrective positioning process for the whole of the program is stated in the head of the program.

Moreover, in the embodiment, the coordinate conversion parameters have been explained as including the link length. With regard to application of the present invention to a robot of a type having a wrist portion thereof mounted to a link, at the side close to the distal end of the arm, in a manner offset from the axis of the same link, it is necessary to take into account the offset length of the wrist portion as the coordinate conversion parameter.

We claim:

1. A corrective positioning method for a robot including a body having an arm comprised of links, and the error inherent to the robot includes an error of a pivotal center position of the arm and link length error of lengths of the links, which are inherent to the robot body, comprising steps of:
   (a) setting a correction parameter indicative of an error inherent to the robot, including substeps of:
      (a1) sequentially performing calibration based on a plurality of known points, to obtain displayed rotary angles respectively associated with the links;
      (a2) deriving a required number of equations which only include, as unknowns, the link length errors and link rotary angles at the time of the calibration;
      (a3) determining the error of the pivotal center position of the arm on the basis of the link length errors, and the link rotary angles, which are respectively determined by solving the equations; and
      (a4) determining link rotary angle errors respectively associated with the links on the basis of the displayed rotary angles and the link rotary angles, said correction parameter including the link rotary angle errors together with the link length errors and the error of the pivotal center position of the arm;
   (b) correcting a robot positioning command, which does not take into account the error inherent to the robot, on the basis of the correction parameter when the robot positioning command is input; and
   (c) positioning the robot in accordance with the corrected robot positioning command.

2. A method for correcting positioning of a machine, comprising the steps of:
   (a) obtaining and storing center position, link length and rotary angle data during calibration of the machine;
   (b) calculating and storing error in the center position and link length data; and
   (c) calculating corrected rotary angle data based on the calculated errors in the center position and link length data, and positioning the machine in accordance with the corrected rotary angle data, said step (c) including:
      (c1) determining whether a correcting parameter has been set to a predetermined value;
      (c2) correcting the center position data, link length data, and obtaining rotary angle error data, based on the error calculated in step (b), when the correcting parameter has been set to the predetermined value;
      (c3) setting the rotary angle error data to zero when the correcting parameter has not been set to the predetermined value;
      (c4) calculating the corrected rotary angle data based on the center position, link length and rotary angle pivot data; and
      (c5) positioning the machine in accordance with the corrected rotary angle data.

* * * * *

UNITED STATES PATENT AND TRADEMARK OFFICE
CERTIFICATE OF CORRECTION

PATENT NO. : 5,189,351
DATED : FEBRUARY 23, 1993
INVENTOR(S) : NOBUTOSHI TORII ET AL.

It is certified that error appears in the above-identified patent and that said Letters Patent is hereby corrected as shown below:

Col. 2, line 42, "pertains" should be --performs--;
        line 58, "effort" should be --error--.

Col. 5, line 58, "$\Delta 1$," should be --$\Delta 11$,--;
        line 59, "1," should be deleted.

Col. 7, line 58, "error" should be --errors--.

Col. 8, line 36, "error" should be --errors--.

Signed and Sealed this

Twenty-eighth Day of December, 1993

Attest:

BRUCE LEHMAN

Attesting Officer      Commissioner of Patents and Trademarks